United States Patent
Saito et al.

[11] Patent Number: 6,012,795
[45] Date of Patent: Jan. 11, 2000

[54] INK AMOUNT DETECTING DEVICE AND RECORDING APPARATUS PROVIDED WITH SUCH A DEVICE

[75] Inventors: Atsushi Saito, Yokohama; Yasuhiko Ikeda, Sagamihara; Akio Okubo, Tokyo, all of Japan

[73] Assignee: Canon Kabushiki Kaisha, Tokyo, Japan

[21] Appl. No.: 08/835,355

[22] Filed: Apr. 7, 1997

Related U.S. Application Data

[63] Continuation of application No. 08/070,259, Jun. 2, 1993, abandoned.

[30] Foreign Application Priority Data

Jun. 3, 1992 [JP] Japan .................................. 4-142667

[51] Int. Cl.⁷ ................................................ B41S 2/195
[52] U.S. Cl. ................................. 347/7; 73/291; 116/227
[58] Field of Search ...................... 347/7, 19; 73/290 R, 73/291, 301, 293; 101/364, 366; 116/109, 227; 340/618, 619

[56] References Cited

U.S. PATENT DOCUMENTS

| | | | |
|---|---|---|---|
| 4,202,267 | 5/1980 | Heinzl et al. | 101/364 |
| 4,246,489 | 1/1981 | Yoshida et al. | 250/577 |
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,737,801 | 4/1988 | Ichihashi et al. | 347/85 |
| 4,740,796 | 4/1988 | Endo et al. | 347/56 |
| 4,788,444 | 11/1988 | Williams | 340/619 X |
| 4,809,551 | 3/1989 | Grossiord | 73/327 |
| 4,977,413 | 12/1990 | Yamanaka et al. | 347/7 |
| 5,166,707 | 11/1992 | Watanabe et al. | 347/3 |

FOREIGN PATENT DOCUMENTS

| | | |
|---|---|---|
| 444861 | 9/1991 | European Pat. Off. . |
| 34 08 302 | 9/1985 | Germany ........................ B41J 27/00 |
| 3408302 | 9/1985 | Germany . |
| 54-056847 | 5/1979 | Japan . |
| 59-123670 | 7/1984 | Japan . |
| 59-138461 | 8/1984 | Japan . |
| 60-071260 | 4/1985 | Japan . |
| 60-172546 | 9/1985 | Japan ................................ B41J 3/04 |
| 61-086265 | 5/1986 | Japan . |
| 62-21549 | 1/1987 | Japan . |
| 62-156963 | 7/1987 | Japan . |
| 63-013733 | 1/1988 | Japan . |
| 63-115757 | 5/1988 | Japan ................................ B41J 3/04 |
| 2-102062 | 4/1990 | Japan . |

*Primary Examiner*—John Barlow
*Assistant Examiner*—Craig A. Hallacher
*Attorney, Agent, or Firm*—Fitzpatrick, Cella, Harper & Scinto

[57] ABSTRACT

An ink detecting device capable of detecting the amount of ink in an ink tank uses a light emitting device to shine light toward a transparent member in a wall of the ink tank. The ink tank is used in a recording apparatus and is moved relative to a recording medium as a recording head ejects ink onto the recording medium A light receiving member receives light reflected on an inner surface of the transparent member when ink is not in contact with that surface. However, if ink is in contact with the inner surface, no light is reflected to the light receiving member. Thus, a reliable indication of the presence of ink in a movable ink tank, or plural movable ink tanks, can be obtained in the absence of physical contact therewith.

20 Claims, 10 Drawing Sheets

INK AMOUNT DETECTING DEVICE AND RECORDING APPARATUS PROVIDED WITH SUCH A DEVICE

This application is a continuation of application Ser. No. 08/070,259 filed Jun. 2, 1993, now abandoned.

BACKGROUND OF THE INVENTION

1. Field of the Invention

The present invention relates to an ink amount detecting device for informing of the shortage of ink remainder in a printing apparatus or the like of an ink jet type, for example.

2. Related Background Art

As means for detecting a shortage of the amount of ink remainding in a printing apparatus using a liquid ink as a recording agent, there has hitherto been available, among various others, a method for detecting the surface of the liquid ink liquid utilizing the electrical conductivity of the ink by providing a pair of electrodes in an ink tank; a method for detecting by a pressure sensor the negative pressure which is generated when the ink is exhausted from an ink container having a flexible bag; or a method for optically detecting the position of a float which floats in the tank using an infrared light which passes through the tank wall. Among them, the method for optically detecting the float position is particularly desirable and excellent from the viewpoint of apparatus maintenance because this method is of the non-contact type and there is no need for embedding any detecting members in the tank or in the ink guiding passage unlike other methods.

Nevertheless, since this optical detection method uses a float, in some cases binding or sticking occurs between the tank wall and the float, leading to a significant drawback such as lowering the reliability.

Also, in a case of a printing apparatus of a serial type which records by allowing the recording head to scan a recording sheet, the ink container is arranged to move along with the recording head. Thus, it is necessary to provide a mechanism to detect the ink remainder in such a movable ink container, which creates a problem in making the recording head portion small and light, the wiring arrangement simple, or the like, leading to the complicated structure of the apparatus after all.

SUMMARY OF THE INVENTION

In consideration of the problems encountered in the related art, the present invention is designed and achieved by giving thought to the aspects which have never been predicted.

It is an object of the present invention to provide a highly reliable ink detecting device capable of detecting the amount of ink contained in ink reservoir means, and a recording apparatus provided with such a device.

It is another object of the present invention to provide an ink detecting device used for a recording apparatus for recording on a recording medium by use of a plurality of recording means for recording on the recording medium while being shifted correlatively with respect to the recording medium corresponding to a plurality of different colors of ink, which is capable of detecting the amount of ink in a plurality of ink reservoir means shiftable together with the aforesaid recording means correlatively with respect to the recording medium, comprising:

a transparent member provided for the wall of each of the foregoing ink reservoir means;

light emitting means for emitting light provided in a given position along the shifting passage of the foregoing ink reservoir means in order to emit light to the foregoing transparent member arriving at the foregoing given position;

light receiving means for receiving the light which is emitted from the foregoing light emitting means and totally reflected at least once on the inner surface of the foregoing transparent member in the ink reservoir means;

wherein the light emitted from the foregoing light emitting means to the foregoing transparent member reaches the foregoing light receiving means when totally reflected at least once on the inner surface of the foregoing ink reservoir means which is not in contact with the ink, and is transmitted without any total reflection through the inner surface of the foregoing ink reservoir means which is in contact with the ink; and detecting means for detecting per ink reservoir means whether the foregoing light receiving means has received the light or not when the foregoing plural ink reservoir means arrive at the foregoing given position.

It is still another object of the present invention to provide a recording apparatus provided with the above-mentioned ink detecting device.

It is a further object of the present invention to provide an ink detecting device used for a recording apparatus for recording on a recording medium by use of recording means for recording on the recording medium while being shifted correlatively with respect to the recording medium, which is capable of detecting the amount of ink in ink reservoir means shiftable together with the aforesaid recording means correlatively with respect to the recording medium, comprising:

a transparent member provided for the wall of the foregoing ink reservoir means;

light emitting means for emitting light provided in a given position along the shifting passage of the foregoing ink reservoir means in order to emit light to the foregoing transparent member arriving at the foregoing given position;

light receiving means for receiving the light which is emitted from the foregoing light emitting means and totally reflected at least once on the inner surface of the foregoing transparent member in the ink reservoir means;

wherein the foregoing transparent member is provided with a stepping plane orthogonal to the axis of the incident light which is incident upon the portion where the light emitted from the foregoing light emitting means enters, and a stepping plane orthogonal to the axis of the emitting light is provided on the portion where the light is emitted to the foregoing light receiving means, and the light emitted from the foregoing light emitting means to the foregoing transparent member reaches the foregoing light receiving means when totally reflected at least once on the inner surface of the foregoing ink reservoir means which is not in contact with the ink, and is transmitted without any total reflection through the inner surface of the foregoing ink reservoir means which is in contact with the ink; and detecting means for detecting whether the foregoing light receiving means has received the light or not when the foregoing ink reservoir means arrives at the foregoing given position.

It is still a further object of the present invention to provide a recording apparatus provided with the above-mentioned ink detecting device.

DETAILED DESCRIPTION OF THE PREFERRED EMBODIMENTS

Hereinafter, with reference to the accompanying drawings, the detailed description will be made of the embodiments according to the present invention.

<Embodiment 1>

As an embodiment of the present invention, the description will be made of an example applicable to an ink remainder detecting unit of an ink jet recording apparatus.

Figure 1:
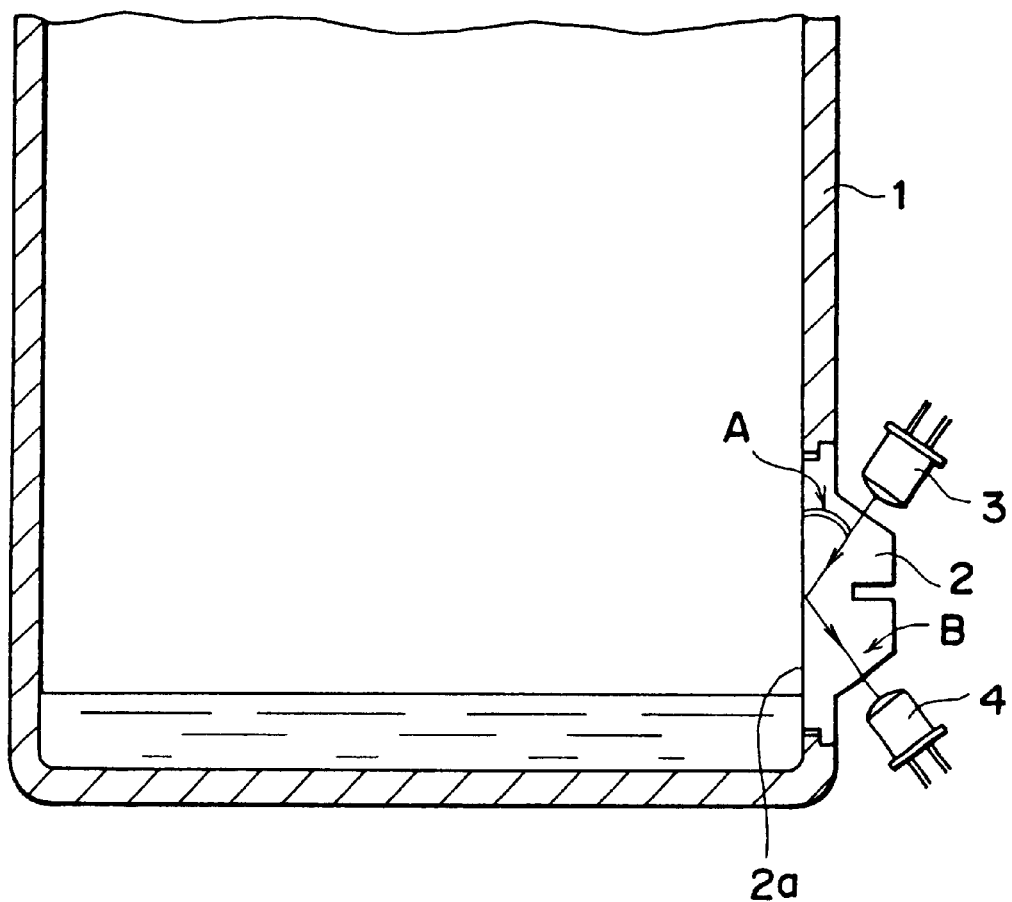
FIG. 1 is a view illustrating a way in which ink detection is made according to the present embodiment (when ink is absent).

FIG. 1 is a view illustrating an ink tank unit of an ink jet recording apparatus to which the present invention is applied. In FIG. 1, a hole is made at a part of the tank wall 1. An optical passage board 2 is provided for the hole portion and adhesively bonded or ultrasonically welded to the tank wall face to couple them so that no ink leaks from the inside. A light emitting element 3 used for this example is an LED emitting infrared light. Also, a light receiving element 4 used for this example is a phototransistor. The light emitting element 3 and light receiving element 4 are each provided with a collimator lens, respectively, to enhance orientation, and are arranged so that the light emitted from the light emitting element 3 is guided to the light receiving element 4 through the path represented by arrow B indicating the optical passage. Also, in this example, the ink tank is of a disposable ink cartridge type. Therefore, the light emitting element 3 and light receiving element 4 are fixed on the main body side, and the structure is arranged to implement the above-mentioned positional relationship by the ink tank guiding means which is provided separately.

Figure 2:
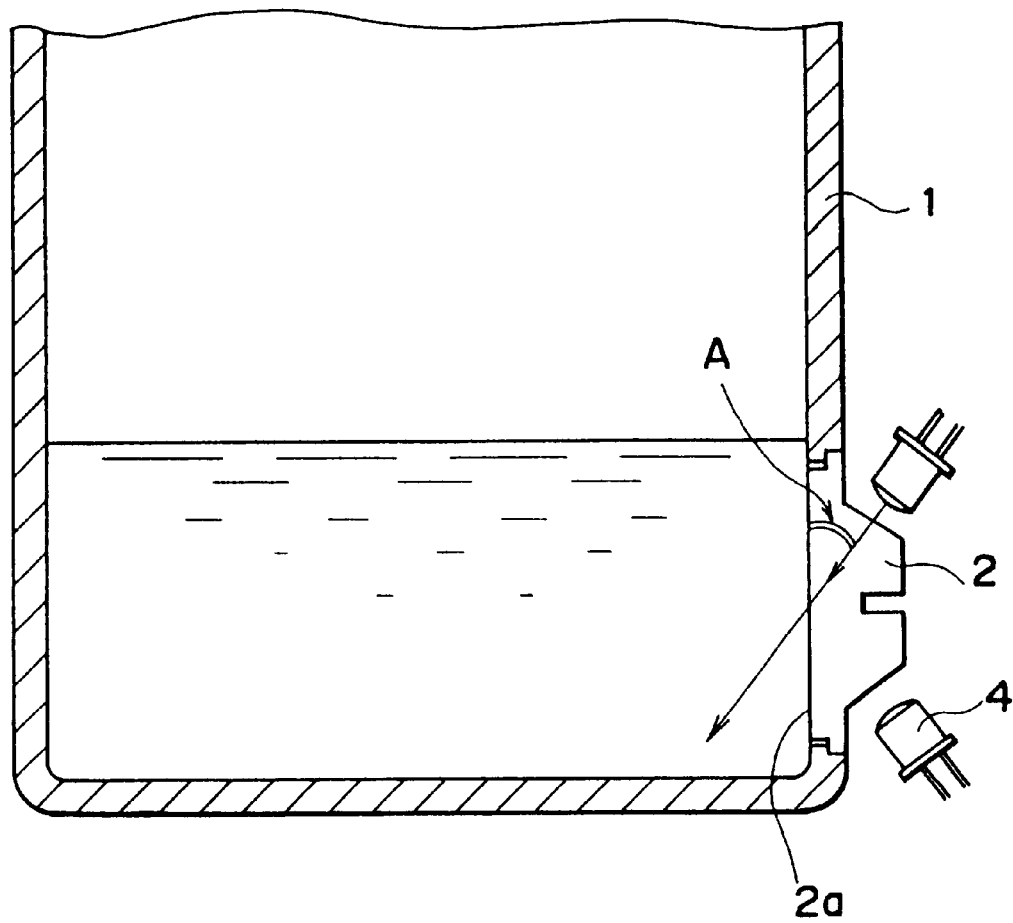
FIG. 2 is a view illustrating a way in which ink detection is made according to the present embodiment (when ink is present).

Now, the description will be made of the operational principles of the above-mentioned embodiment. In the present embodiment, the optical passage board 2 is made of a transparent acrylic resin. The refractive index of the transparent acrylic resin is approximately 1.49. When the tank is empty (that is, the state where it is filled with in), the critical angle is approximately 48° where the refractive index of the air is 1. In the present embodiment, since the incident angle A is defined as 37°, the light emitted from the light emitting element 3 is totally reflected by the inner surface 2a of the optical passage board as shown in FIG. 1, and most of the incident infrared light reaches the light receiving element 4 (light passage indicated by an arrow in FIG. 1). To the contrary, when ink is present on the inside of the tank, the critical angle will be approximately 9° because the refractive index of the ink is 1.47 approximately. Accordingly, there is no reflection. The light emitted from the light emitting element 3 passes the inner surface 2a of the optical passage board and does not reach the light receiving element 4 (passage represented in FIG. 2). Therefore, it is possible to detect the presence and absence of the ink by observing the output of the light receiving element 4; hence this enables the user of an ink jet recording apparatus to be informed of the absence of ink.

Figure 4:
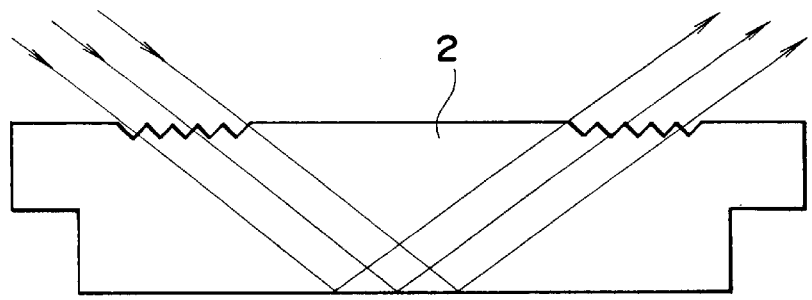
FIG. 4 is a view showing an example of an optical passage board.

Also, it is possible to configure the optical passage board as shown in FIG. 4 or to integrally form the tank wall surface in the configuration of the optical passage block. The outer surface of the optical passage board 2 is formed to provide a serrated cross section so that the outer surface is at right angles to the incident light and the exit light in order to prevent the loss caused by the reflection of the incident light and exit light from the light emitting element 3, but not to be extruded from the tank wall surface 1. If the optical passage board 2 is configured as shown in FIG. 4, this board 2 does not extrude from the tank wall surface 1, which will contribute to implementing a small device.

Figure 3:
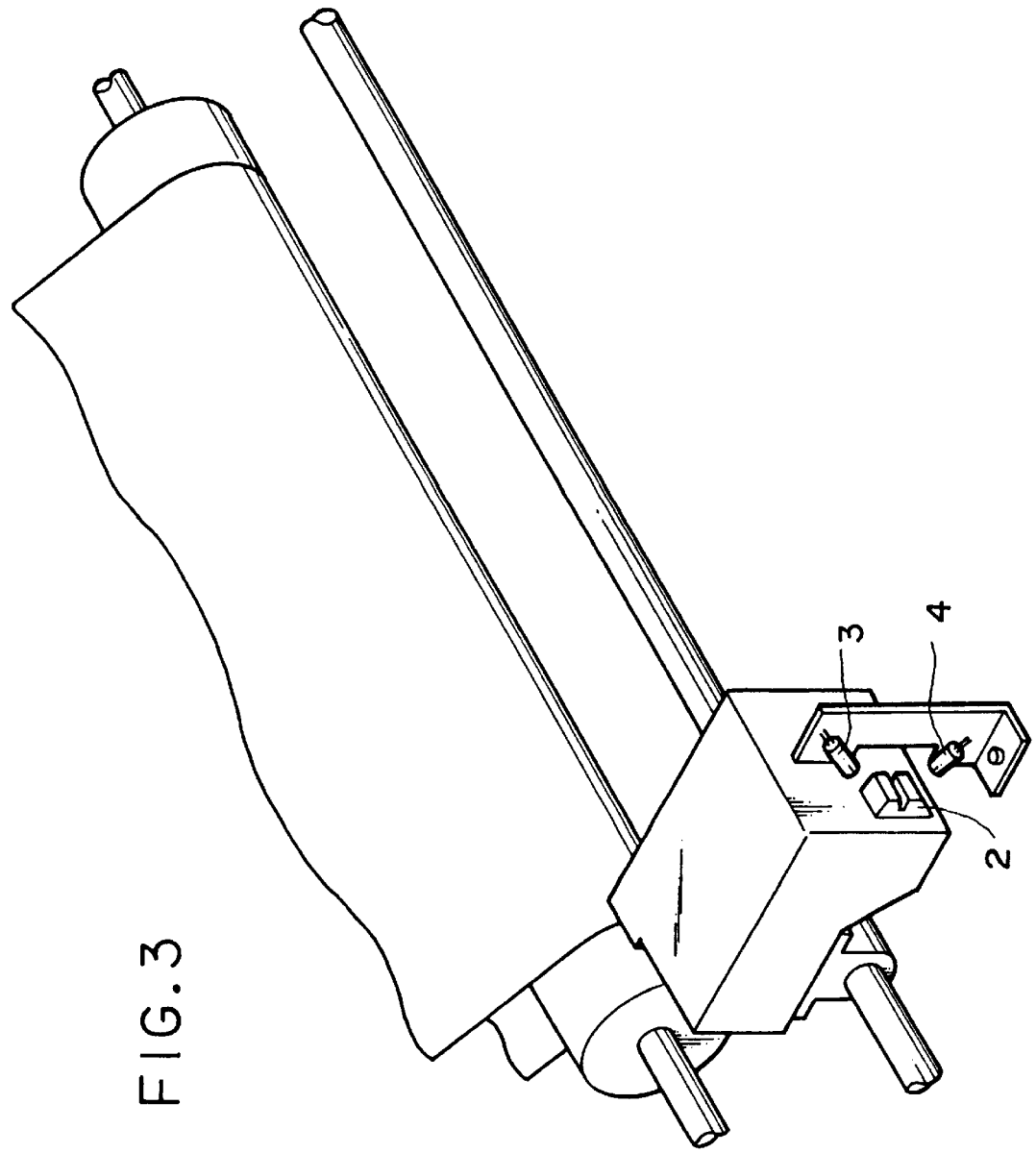
FIG. 3 is a view showing an example of the application of the device to a serial printer.
Figure 5:
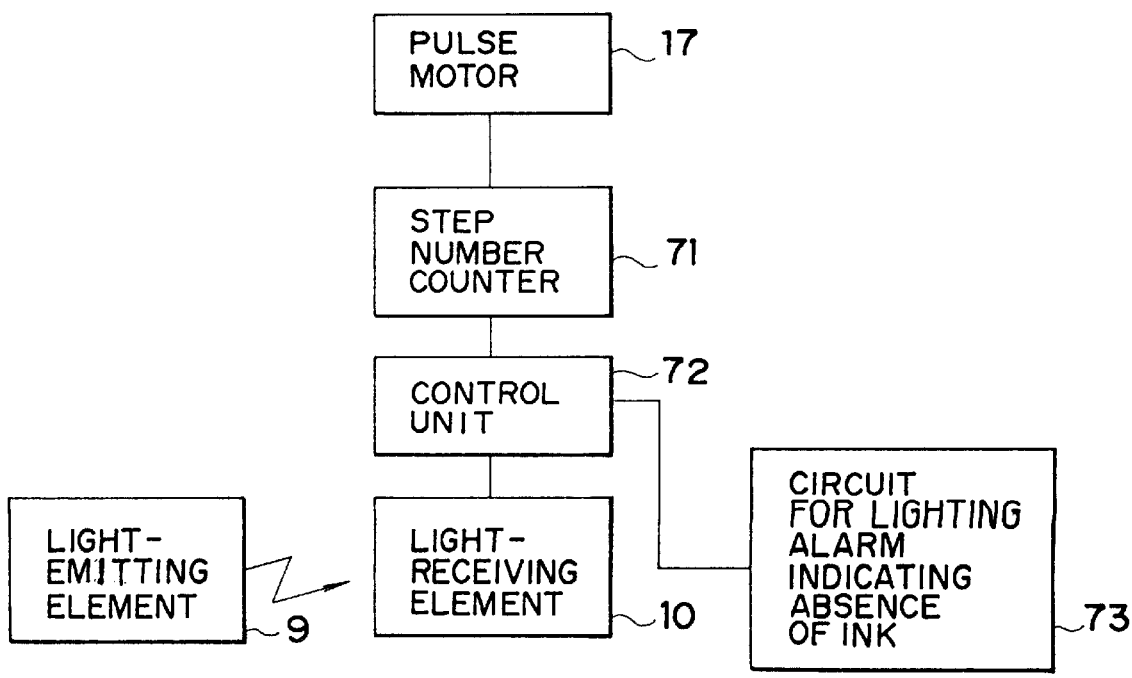
FIG. 5 is a block diagram of an ink detecting process in a serial printer according to embodiment 1.

The ink detecting device described above is easily applicable to a serial printer which holds the recording head and ink tank on the carriage as shown in FIG. 3. In this case, the light emitting element 3 and light receiving element 4 are fixed in the home position or the like on the main body side. Thus, the structure is arranged so that a detecting circuit is actuated when the carriage arrives at the detecting position. In this way, it is possible to avoid having any cables connecting the carriage and the main body for the purpose of measuring the ink. The operation of this printer will be described in conjunction with FIG. 5 and FIG. 6. FIG. 5 is a block diagram showing this ink detecting device. A pulse motor 17 which drives the carriage is driven in accordance with the value of a step number counter 71. A control unit 72 causes the carriage to be shifted to a given position. Then, depending on whether the light emitted from a light emitting element 9 is received by a light receiving element 10 or not, an ink absence alarm light illuminating circuit 73 is turned on.

Figure 6:
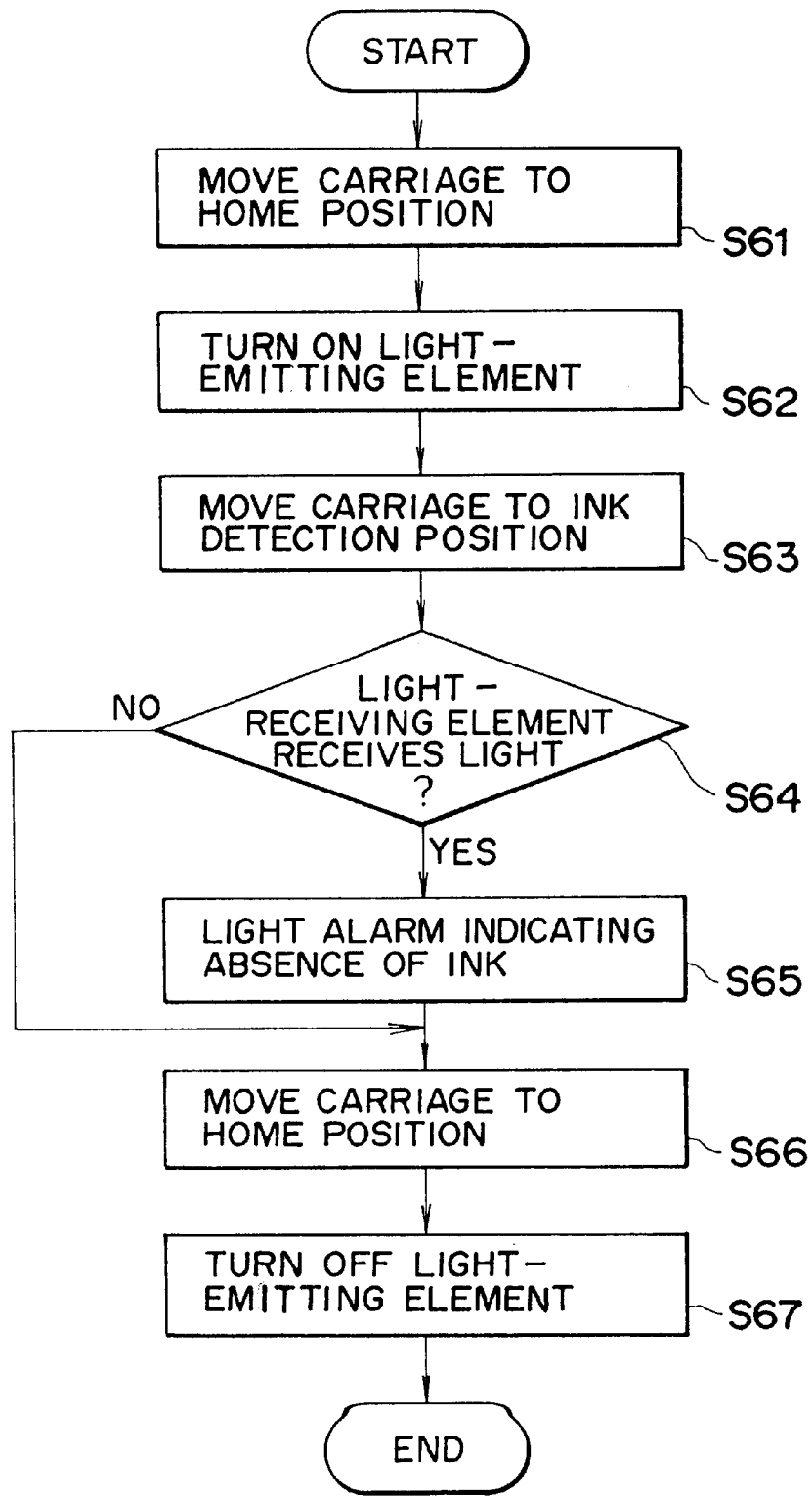
FIG. 6 is a flowchart showing the ink detecting process in the serial printer according to embodiment 1.

FIG. 6 is a flowchart illustrating this control. This flowchart is executed by the control unit 72. At first, the carriage is returned to the home position (S61). The light emitting element is illuminated (S62). Then, the carriage is shifted to the ink detecting position, that is, a given position where the light from the light emitting element 3 reaches the optical passage board 2 of the ink tank (S63). It is possible to judge that the carriage is in a given position according to a value of the step number counter 71. Thus, when the position is determined, a test is given to ascertain whether the light receiving element receives light or not (S64). If affirmative, ink is not in contact with the inner surface of the optical passage member 2, and it is known that the total reflection has taken place. Then, the ink absence alarm is illuminated (S65). Subsequently, the carriage is returned to the home position (S66). The light emitting element is turned off (S67) to terminate the process.

With the procedures described above, the presence or absence of ink in the tank can be detected.

Also, the detecting principle of the present invention utilizes the refractive index of ink. Fundamentally, therefore, it is not affected by the color of any ink. Accordingly, it is possible to apply exactly the same detection circuit to each of the colors of a color printer having a plurality of inks. Hence, as described earlier, a light emitting element and a light receiving element are provided on the main body side, and by stopping the carriage at the position of each tank having a different color, it is possible to detect all kinds of color inks in use.

<Embodiment 2>

As a second embodiment according to the present invention, the description will be made of an example in which the invention is applied to an ink remainder detecting unit of a color ink jet recording apparatus.

Figure 7:
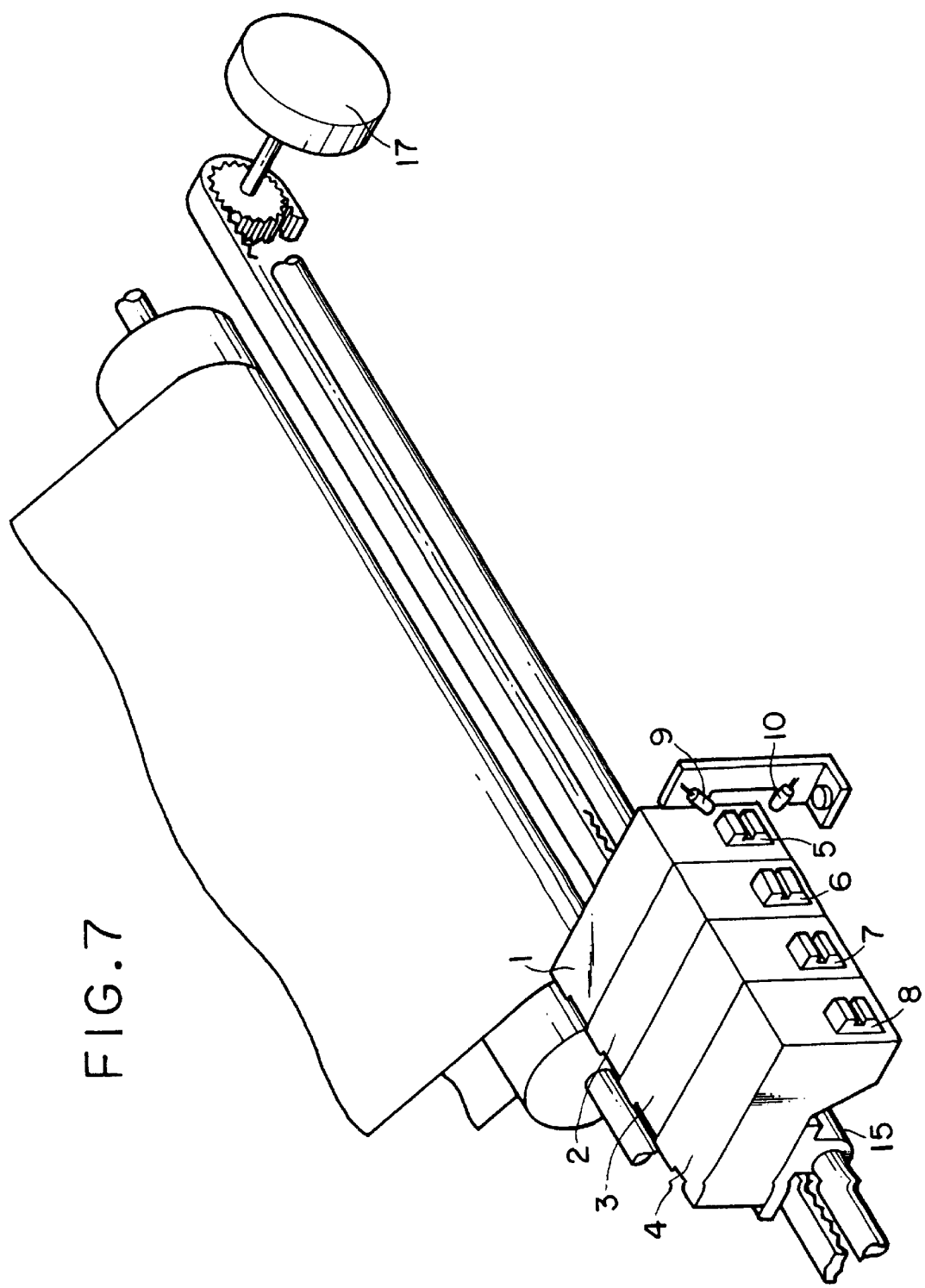
FIG. 7 is a view showing an example of the application of the device to a color serial printer.

FIG. 7 is a view showing the carriage portion of a color ink jet recording apparatus to which the present invention is applied. In FIG. 7, an image of each color element is recorded by a four-color head having a head 1 for recording in black, head 2 in yellow, head 3 in magenta, and head 4 in cyan. Then, a full color recording is executed by superposing the images in four colors appropriately. On the wall surface of ink tank for each head, each of the optical passage members 5 to 8 is provided, respectively.

The ink remainder detection for each tank can be made in the same manner as described in the foregoing embodiment. In other words, the optical passage members 5 to 8 correspond to the optical passage member 2 in FIG. 1 and FIG. 2 while the light emitting element 9 corresponds to the light emitting element 3, and the light receiving element 10 to the element 4. To exemplify the head 1, when ink is present in the ink container of the head 1, the light emitted from the light emitting element 9 is transmitted through the inside of the tank because the refractive index of the optical passage member 5 and that of the ink in the container are substantially the same. If the ink is absent, the total reflection occurs on the inner surface of the optical passage member 5, thus enabling the light to reach the light receiving element 10. This property is utilized for the detection of ink in the tank.

Figure 8:
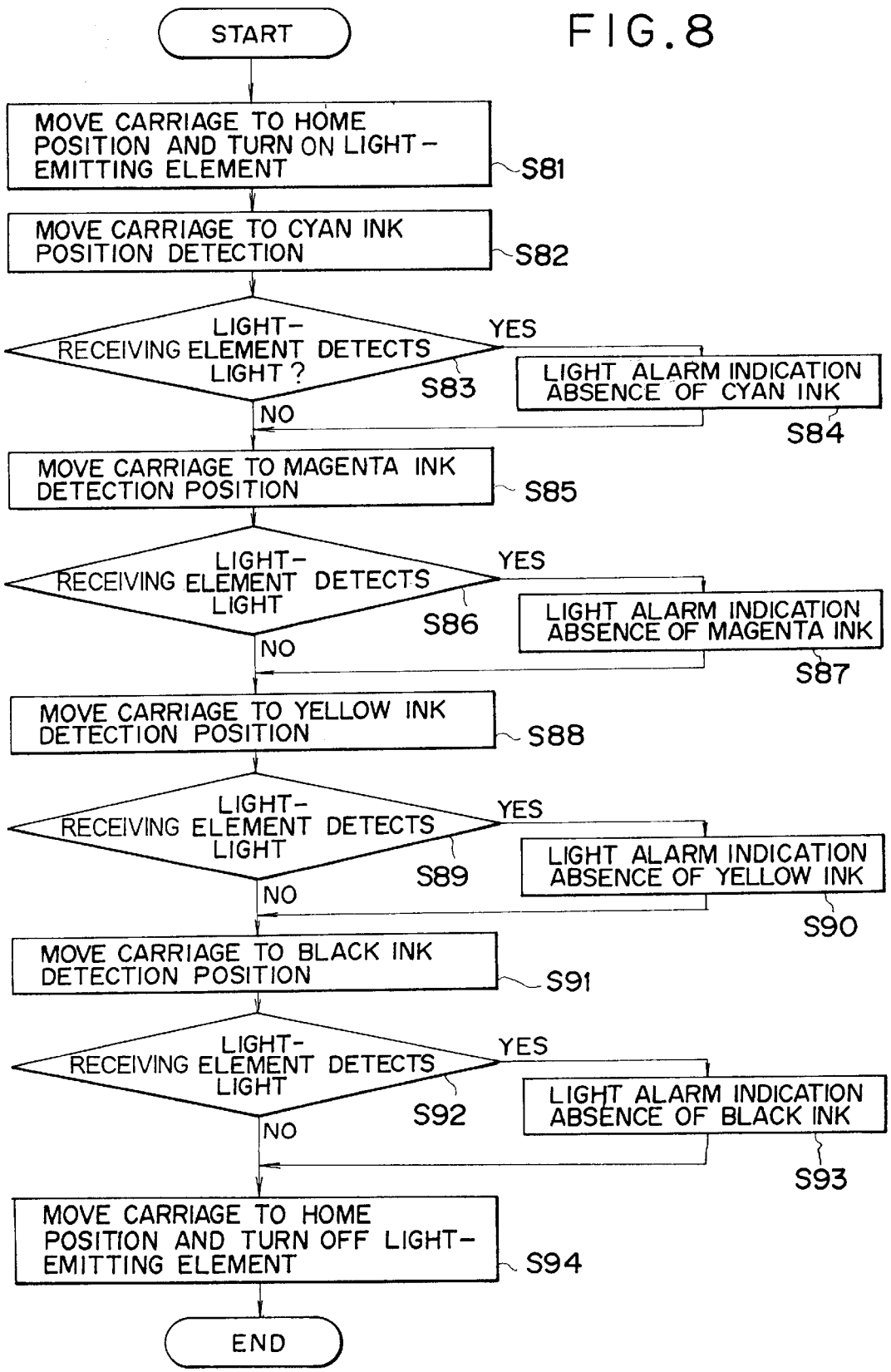
FIG. 8 is a flowchart showing an ink detection process in a color serial printer according to the embodiment 2.

Subsequently, the description will be made of an actual ink remainder detecting sequence in conjunction with a flowchart shown in FIG. 8. This flowchart is executed by a control unit which controls the recording apparatus, the block diagram of which is shown in FIG. 6.

At first, a pulse motor 17 is driven to shift the carriage 15 to the home position to illuminate the light emitting element 9 (S81). Then, although the carriage 15 is driven by the pulse motor 17 (S82), a step number is counted by a step number counter 71 which is separately arranged, and when the carriage passes the cyan detecting position, that is, the position in which the light from the light emitting element 9 is incident upon the optical passage member 8 provided for the cyan head 4, the carriage refers to the output of the light receiving element 10 (S83). At this juncture, if the ink in the cyan head 4 is sufficient, the light receiving element 10 does not detect any light, but if the remainder of the ink is insufficient, the totally reflected light on the inner surface of the optical passage member 8 is detected by the light receiving element. Then, an alarm lamp (not shown) is illuminated to promote the supply of ink to the cyan head 4 (S84).

Further, the same operation will be executed when the carriage passes the detecting position of each of the magenta, yellow, and black heads. Then, lastly, the carriage 15 is returned to the home position to turn off the light emitting element 9, thus terminating the ink remainder detection (S85 to S94).

The carriage speed for executing this operation should desirably be a motion having a constant velocity of 100 mm/s or less in order to avoid inviting any erroneous detection due to oscillation of the liquid surface in the ink tank. Further, although it may take extra time, it may be possible to stop the carriage 15 at each of the head detection positions for the execution of this detection.

As described above, attention is given to the fact that the four color ink tanks are arranged on the carriage 15 in parallel in the traveling direction of the carriage 15 for the color ink jet printer, and the optical passage members 5 to 8 are also arranged in parallel in the traveling direction of the carriage 15 for each of the four color ink tanks. Thus, by allowing the detecting unit where the light emitting element 9 and light receiving element 10 are arranged to pass each of them sequentially, it is intended to detect each of the four color ink remainders rapidly and without any direct contact. Furthermore, the structure according to the present embodiment enables the entire system of the detecting unit to be formed on the side end of the tank. Therefore, compared to the system using the float position detection which requires the detecting member to be arranged on the lower part of the ink tank due to its structural arrangement, the probability of occurrence of any miscarriage is extremely small in executing the detection which may cause an ink leakage by chance, leading to the ink adhesion to the optical components or a short circuit of electrical circuits. Thus, the device reliability will be significantly improved. Also, for the ink tank which travels with the carriage, it will suffice if only the optical passage member is provided while the other structural components can be fixed to the main body. As result, it is possible to make the head portion small and light. There is also no need for connecting any flexible cables and the like to the head for the ink detection, hence making the provision of a simple structure possible.

In this respect, the present invention may be applicable to a system comprising a plurality of equipment or to a system comprising a single equipment. The present invention is also applicable to a system or apparatus which becomes operative when a program is provided as a matter of course.

Also, as ink usable for the present invention, it is possible to employ a plurality of ink having different colors. The plurality of ink having different colors include those having different densities for one kind of color.

The present invention produces an excellent effect on ink jet recording methods, particularly a recording head and a recording apparatus wherein the flying droplets are formed by utilizing thermal energy to perform recording.

Regarding the typical structure and operational principle of such a method, it is preferable to adopt those which can be implemented using the fundamental principles disclosed in the specifications of U.S. Pat. Nos. 4,723,129 and 4,740,796. This method is applicable both to the so-called on-demand type recording system and a continuous type recording system. Particularly, however, it is suitable for the on-demand type because the principle is such that at least one driving signal, which provides a rapid temperature rise beyond a departure from nucleate boiling point in response to recording information, is applied to an electrothermal transducer disposed on a liquid (ink) retaining sheet or liquid passage whereby to cause the electrothermal transducer to generate thermal energy to produce film boiling on the thermoactive portion of the recording head; thus effectively leading to the resultant formation of a bubble in the recording liquid (ink) one to one for each of the driving signals. By the development and contraction of the bubble, the liquid (ink) is discharged through a discharging port to produce at least one droplet.

The driving signal is preferably in the form of pulses because the development and contraction of the bubble can be effectuated instantaneously, and, therefore, the liquid (ink) is discharged with quick response. The driving signal in the form of pulses is preferably such as disclosed in the specifications of U.S. Pat. Nos. 4,463,359 and 4,345,262. In this respect, the temperature increasing rate of the heating surface is preferably such as disclosed in the specification of U.S. Pat. No. 4,313,124 for an excellent recording in a better condition.

The structure of the recording head may be as shown in each of the above-mentioned specifications wherein the structure is arranged to combine the discharging ports, liquid passages, and the electrothermal transducers as disclosed in the above-mentioned patents (linear type liquid passage or right angle liquid passage). Besides, the structure such as disclosed in the specifications of U.S. Pat. Nos. 4,558,333 and 4,459,600 wherein the thermal activation portions are arranged in a curved area is also included in the present invention.

In addition, the present invention is applicable to the structure disclosed in Japanese Laid-Open Application No. 59-123670 wherein a common slit is used as the discharging ports for plural electrothermal transducers, and to the structure disclosed in Japanese Patent Laid-Open Application No. 59-138461 wherein an opening for absorbing a pressure wave of the thermal energy is formed corresponding to the discharging ports.

Moreover, the present invention is effectively applicable to a serial type recording head wherein the recording head is fixed on the main assembly; to a replaceable chip type recording head which is connected electrically with the main apparatus and for which the ink is supplied when it is mounted in the main assemble; or to a cartridge type recording head having an ink container integrally provided for the head itself.

Also, as constituents of a recording head according to the present invention, it is preferable to provide recording head recovery means and preliminarily auxiliary means additionally because these constituents will contribute to making the effectiveness of the present invention more stabilized. To name them specifically, such constituents are capping means for the recording head, cleaning means, compression or suction means, preliminary heating means such as electrothermal transducers or heating elements other than such transducers or the combination of those types of elements, and a preliminary discharge mode besides the regular discharge made for recording.

Further, as the recording mode of the apparatus, the present invention is extremely effective in applying it to an apparatus having at least one of a multi-color mode with inks of different colors, a full-color mode using the mixture of the colors, or a mode using the kinds of ink which are of the same color but have different densities, irrespective of whether the recording head is integrally structured or it is structured by a combination of plural recording heads.

Now, in the embodiments according to the present invention set forth above, while the ink has been described as liquid, it may be an ink material which is solidified when below room temperature but liquefied at room temperature. Since the ink is kept within the temperature not lower than 30° C. and not higher than 70° C. to stabilize its viscosity for the purposes of stable ejection in general, the ink may be such that it can be liquefied when the applicable recording signals are given.

In addition, while positively preventing the temperature rise due to the thermal energy by the use of such energy as an energy consumed for changing states of ink from solid to liquid, or using the ink which will be solidified when left intact for the purpose of preventing ink evaporation, it may be possible to apply to the present invention the use of an ink having a nature of being liquefied only by the application of thermal energy such as an ink capable of being ejected as ink liquid by enabling itself to be liquefied anyway when the thermal energy is given in accordance with recording signals, an ink which will have already begun solidifying itself by the time it reaches a recording medium. For an ink such as this, it may be possible to retain the ink as a liquid or solid material in through holes or recesses formed in a porous sheet as disclosed in Japanese Patent Laid-Open Application No. 54-56847 or Japanese Patent Laid-Open Application No. 60-71260 in order to execute a mode so as to enable the ink to face the electrothermal transducers in such a state. In the present invention, the most effective method for the respective ink mentioned above is the one which is capable of implementing the film boiling method described above.

Furthermore, as the mode of a recording apparatus according to the present invention, there are a copying apparatus combined with a reader or the like, and an apparatus executing a mode as a facsimile apparatus having the transmission and reception functions in addition to those which are integrally arranged or separately arranged as an image output terminal of an information processing equipment such as the above-mentioned word processor, computer or the like.

Figure 9:
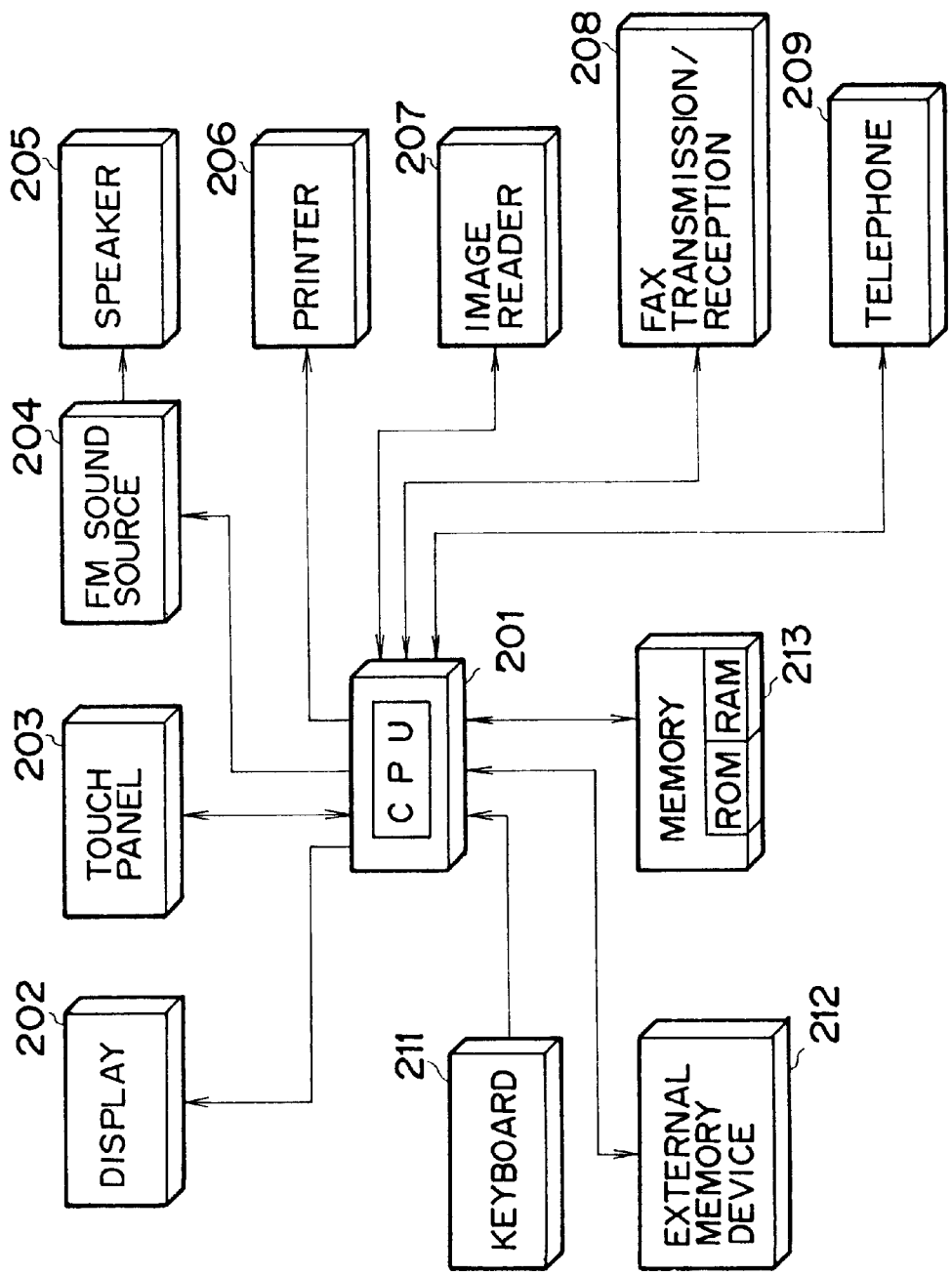
FIG. 9 is a block diagram schematically showing the structure wherein a recording apparatus according to the present invention is applied to an information processing apparatus.

FIG. 9 is a block diagram schematically showing the structure of a recording apparatus according to the present invention when the apparatus is applied to an information processing apparatus having functions of a word processor, a personal computer, a facsimile apparatus, and a copying apparatus. In FIG. 9, a reference numeral 201 designates a control unit provided with a CPU such as a microprocessor, and various I/O ports to control the entire system of the apparatus by outputting control signals, data signals, and others to each unit and inputting control signals and data signals from each unit; 202, a displaying unit, on the screen of which various menus, documentary information, image data read by an image reader 207, and the like are displayed; and 203, a pressure sensitive transparent touch panel arranged on the display unit 202 capable of inputting items, coordinate positions, and the like on the displaying unit 202 when its surface is depressed by a finger or the like as desired.

A reference numeral 204 designates an FM (Frequency Modulation) sound source which stores the music information created by a music editor or the like in a memory 210 and/or an external memory device 212 as digital data, and reads them from the memory and others to perform an FM modulation. The electrical signals from the FM sound source 204 are transduced into the audible sounds by a speaker unit 205. A printer unit 206 is the apparatus to which the present invention is applied as an output terminal for a word processor, personal computer, facsimile apparatus, or copying apparatus.

A reference numeral 207 designates an image reader which is arranged in the conveying passage of source documents in order to photoelectrically read the data on source documents for facsimile and copying operations in addition to reading various other source documents; 208, a facsimile transmission and reception unit which performs the facsimile transmission of the data on the source document read by the image reader 207, and receives the transmitted facsimile signals for demodulation, and which also has a function to interface with the external devices; 209, a telephone unit which has various functions to serve as an ordinary telephone and as a device to automatically take and record messages among others; and 210, a memory unit including the ROM which stores a system program, manager program, and other application programs as well as character fonts, dictionaries, and the like, the RAM which stores the application program and text information load from the external memory device 212, and a video RAM or the like.

A reference numeral 211 designates a keyboard unit which inputs text information and various commands; 212, an external memory device using a floppy disk, hard disk, and the like as its storing medium, and in this external memory device 212, text information, music, or voice information, and user's application program and others are stored.

Figure 10:
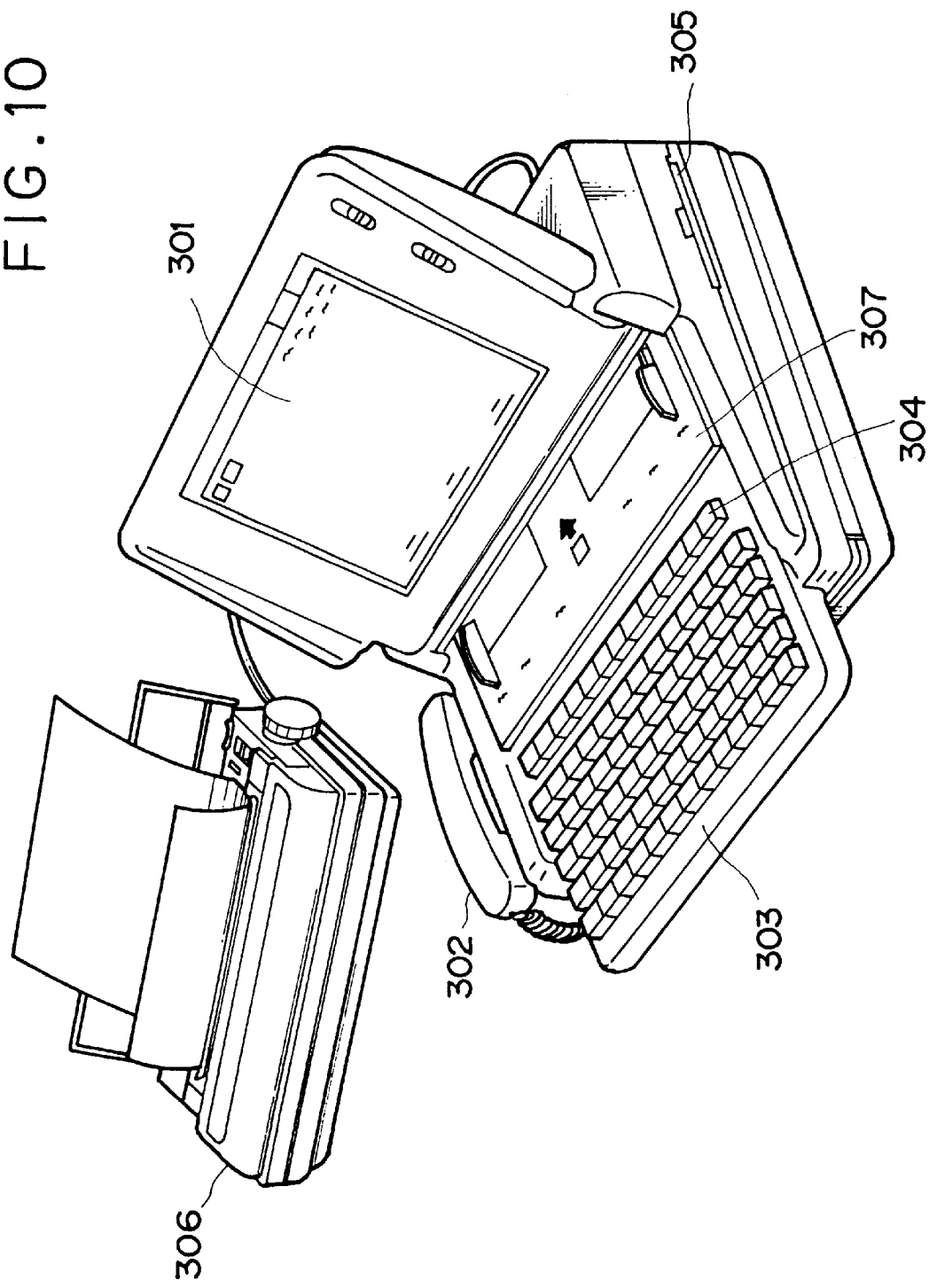
FIG. 10 is a view illustrating the external appearance of an information processing apparatus.

FIG. 10 is a view illustrating the outer appearance of the information processing apparatus shown in FIG. 9. In FIG. 10, a reference numeral 301 designates a flat panel display utilizing liquid crystals and others to display various menus, graphic information, and text information, and enables the coordinate input and item specifying input to be executed when the surface of the touch panel arranged on this display 301 is depressed by a finger or the like; and 302, a hand set which is used when the apparatus functions as a telephone unit.

The keyboard 303 is detachably connected to the main body through a cord, through which various text information and various data can be inputted. Also, the keyboard 303 is provided with various function keys 304 and others; and 305, an insertion inlet for a floppy disk.

A reference numeral 307 designates a sheet stacker where the source documents are stacked for the image reader 207 to read, and the source documents thus read are exhausted from the rear portion of the apparatus. Also, in a case of a facsimile reception, or the like, the recording is made by an ink jet printer 306.

Figure 11:
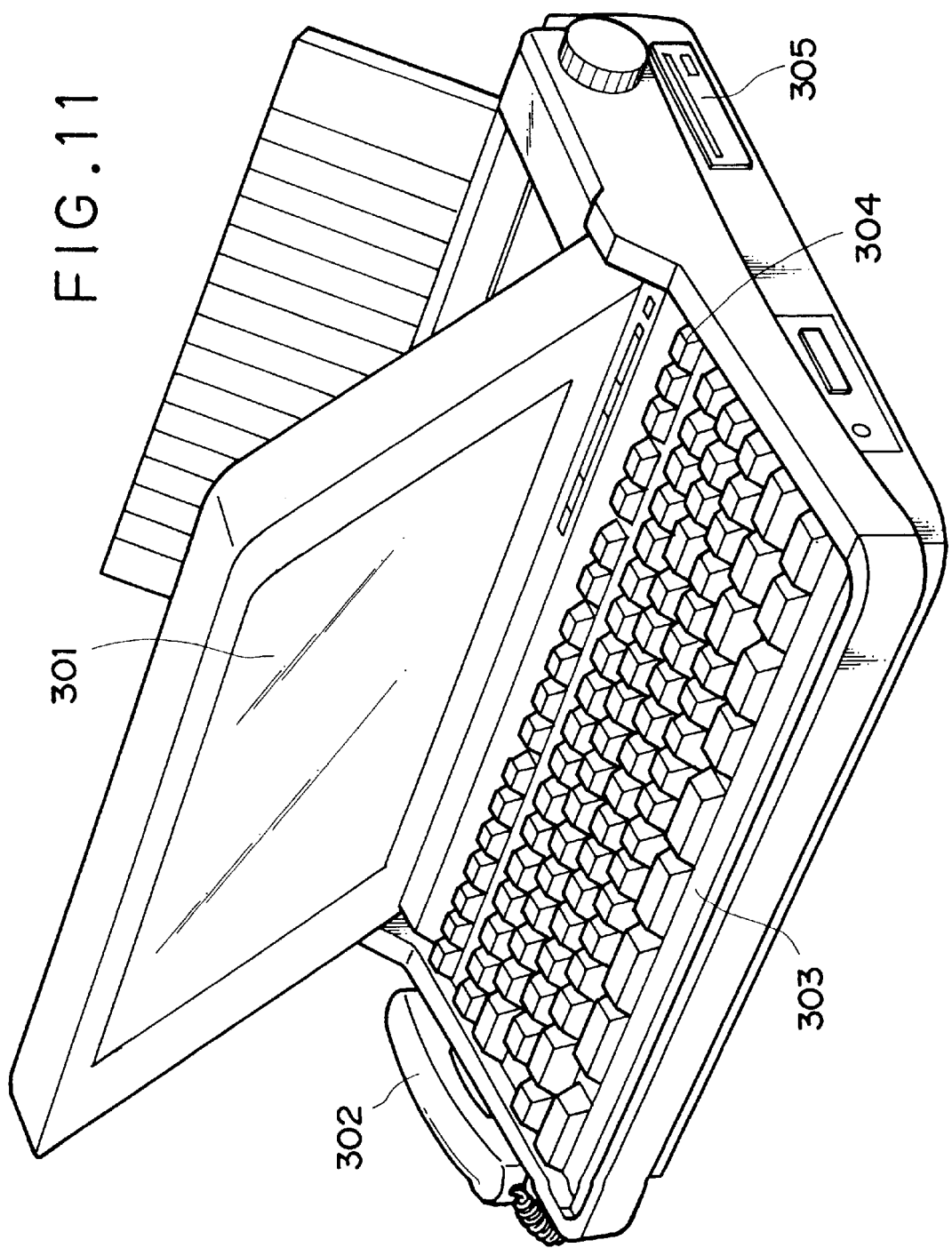
FIG. 11 is a view illustrating the external appearance of another example of the information processing apparatus.

In this respect, the above-mentioned display 301 may be a CRT, but it is desirable to use a flat panel such as a liquid crystal display using a ferroelectric liquid crystals because with such a display, it is possible to make the apparatus small and light. When the above-mentioned image processing apparatus functions as a word processor, the text information inputted through the keyboard unit 211 in FIG. 9 is processed by the control unit 201 in accordance with a text processing program, and output to the printer unit 206 as images. When the above-mentioned information processing apparatus functions as a personal computer, the various data inputted through the keyboard unit 211 are operationally processed by the control unit 201 in accordance with an application program, and the results of the operation are output to the printer unit 206 as images. When the apparatus functions as a receiver of the facsimile apparatus, the facsimile information inputted from a facsimile transmission and reception unit 208 is received by the control unit 201 for processing in accordance with a given program and output to the printer unit 206 as reception images. Also, when the apparatus functions as a copying apparatus, a source document is read by the image reader 207, and the data on the source document thus read are transferred to the printer unit 206 through the control unit 201 and output as copied images. In this respect, when the apparatus functions as a transmitter of the facsimile apparatus, the data on the source documents read by the image reader 207 are processed by the control unit 201 for transmitting in accordance with a given provided, and then, transmitted to the communication line through the facsimile transmitter 208. Here, it may be possible to arrange the above-mentioned apparatus as an integrated type where an ink jet printer is incorporated in the main body as shown in FIG. 11. In this case, the portability will be further enhanced. In FIG. 11, the constituents having the same functions as those shown in FIG. 10 are indicated by the corresponding reference marks.

Since a high-quality recording image is obtainable by applying a recording apparatus according to the present invention to the multi-functional information apparatus as described above, a further enhancement of the functions of the above-mentioned information processing apparatus is possible.

what is claimed is:

1. A recording apparatus for recording on a recording medium by use of a plurality of recording means for recording on the recording medium while being shifted correlatively with respect to the recording medium, said recording means corresponding to a plurality of different kinds of inks, said apparatus comprising:

an ink amount detecting device for detecting an amount of inks in a plurality of ink reservoir means for storing said inks, said reservoir means correlatively shifting along a path with respect to the recording medium together with said recording means, said detecting device comprising:

a transparent member provided in a wall of each of said ink reservoir means, a single light emitting means for emitting light, said light emitting means being provided in a given position which is fixed relative to and along the path of said ink reservoir means, in order to emit light onto said transparent member when said transparent member arrives at a position opposite said light emitting means, a single light receiving means for receiving the light which is emitted from said light emitting means and which is totally reflected at least once on an inner surface of said transparent member in the ink reservoir means, wherein the light emitted from said light emitting means onto said transparent member reaches said light receiving means when totally reflected at least once on the inner surface of said ink reservoir means when said reservoir means is not in contact with the ink at a point where the light is incident on said inner surface, and is transmitted without any total reflection through the inner surface of said ink reservoir means when said reservoir means is in contact with the ink at said point, and detecting means for detecting for each said ink reservoir means if said light receiving means has received the light when said plural ink reservoir means arrive at said given position;

a carriage on which said recording means and said ink reservoir means are mounted;

scan means for scanning said carriage relative to the recording medium; and control means for controlling said scan means to scan said carriage so as to sequentially move the transparent member of each of said reservoir means to said position opposite said light emitting means, so that said detecting device detects the amount of ink remaining in each of said reservoir means.

2. A recording apparatus according to claim 1, wherein said recording means is an ink jet recording head for recording by discharging said ink.

3. A recording apparatus according to claim 2, wherein said ink jet recording head discharges said ink by utilizing thermal energy and comprises a plurality of thermal energy transducers for generating the thermal energy applied to said ink.

4. A recording apparatus according to claim 3, wherein said ink let recording head causes a change of state of said ink in response to the thermal energy which is applied by said thermal energy transducers so as to discharge said ink from a plurality of discharging ports in accordance with said change of state.

5. An image forming apparatus for recording on a recording medium by use of a plurality of recording means for recording on the recording medium while being shifted correlatively with respect to the recording medium, said recording means corresponding to a plurality of different kinds of inks, said apparatus comprising:

an ink amount detecting device for detecting an amount of inks in a plurality of ink reservoir means for storing said inks, said reservoir means correlatively shifting along a path with respect to the recording medium together with said recording means, said detecting device comprising:

a transparent member provided in a wall of each of said ink reservoir means;

a single light emitting means for emitting light, said light emitting means being provided in a given position which is fixed relative to and along the path of said ink reservoir means, in order to emit light onto said transparent member when said transparent member arrives at a position opposite said light emitting means, a single light receiving means for receiving the light which is emitted from said light emitting means and which is totally reflected at least once on an inner surface of said transparent member in the ink reservoir means, wherein the light emitted from said light emitting means onto said transparent member reaches said light receiving means when totally reflected at least once on the inner surface of said ink reservoir means when said reservoir means is not in contact with the ink at a point where the light is incident on said inner surface, and is transmitted without any total reflection through the inner surface of said ink reservoir means when said reservoir means is in contact with the ink at said point, and detecting means for detecting for each said ink reservoir means if said light receiving means has received the light when said plural ink reservoir means arrive at said given position;

a carriage on which said recording means and said ink reservoir means are mounted;

scan means for scanning said carriage relative to the recording medium;

control means for controlling said scan means to scan said carriage so as to sequentially move the transparent member of each of said reservoir means to said position opposite said light emitting means, so that said detecting device detects the amount of ink remaining in each of said reservoir means; and means for reading images on a source document in order to record said images on said recording medium by said recording means.

6. An image forming apparatus for recording on a recording medium by use of a plurality of recording means for recording on the recording medium while being shifted correlatively with respect to the recording medium, said recording means corresponding to a plurality of different kinds of inks, said apparatus comprising:

an ink amount detecting device for detecting an amount of inks in a plurality of ink reservoir means for storing said inks, said reservoir means correlatively shifting along a path with respect to the recording medium together with said recording means, said detecting device comprising:

a transparent member provided in a wall of each of said ink reservoir means, a single light emitting means for emitting light, said light emitting means being provided in a given position which is fixed relative to and along a path of said ink reservoir means, in order to emit light onto said transparent member when said transparent member arrives at a position opposite said light emitting means, a single light receiving means for receiving the light which is emitted from said light emitting means and which is totally reflected at least once on an inner surface of said transparent member in the ink reservoir means, wherein the light emitted from said light emitting means onto said transparent member reaches said light receiving means when totally reflected at least once on the inner surface of said ink reservoir means when said reservoir means is not in contact with the ink at a point where the light is incident on said inner surface, and is transmitted without any total reflection through the inner surface of said ink reservoir means when said reservoir means is in contact with the ink at said point, and detecting means for detecting for each said ink reservoir means if said light receiving means has received the light when said plural ink reservoir means arrive at said given position;

a carriage on which said recording means and said ink reservoir means are mounted;

scan means for scanning said carriage relative to the recording medium;

control means for controlling said scan means to scan said carriage so as to sequentially move the transparent member of each of said reservoir means to said position opposite said light emitting means, so that said detecting device detects the amount of ink remaining in each of said reservoir means; and means for receiving image information for recording on said recording medium by said recording means.

7. An image forming apparatus according to claim 6, further comprising:

means for reading images on a source document in order to record said images on said recording medium by said recording means.

8. An image forming apparatus for recording on a recording medium by use of a plurality of recording means for recording on the recording medium while being shifted correlatively with respect to the recording medium, said recording means corresponding to a plurality of different kinds of inks, said apparatus comprising:

an ink amount detecting device for detecting an amount of inks in a plurality of ink reservoir means for storing said inks, said reservoir means correlatively shifting along a path with respect to the recording medium together with said recording means, said detecting device comprising:

a transparent member provided in a wall of each of said ink reservoir means, a single light emitting means for emitting light, said light emitting means being provided in a given position which is fixed relative to and along the path of said ink reservoir means, in order to emit light onto said transparent member when said transparent member arrives at a position opposite said light emitting means, a single light receiving means for receiving the light which is emitted from said light emitting means and which is totally reflected at least once on an inner surface of said transparent member in the ink reservoir means, wherein the light emitted from said light emitting means onto said transparent member reaches said light receiving means when totally reflected at least once on the inner surface of said ink reservoir means when said reservoir means is not in contact with the ink at a point where the light is incident on said inner surface, and is transmitted without any total reflection through the inner surface of said ink reservoir means when said reservoir means is in contact with the ink at said point, and detecting means for detecting for each of said ink reservoir means if said light receiving means has received the light when said plural ink reservoir means arrive at said given portion;

a carriage on which said recording means and said ink reservoir means are mounted;

scan means for scanning said carriage relative to the recording medium;

control means for controlling said scan means to scan said carriage so as to sequentially move the transparent member of each of said reservoir means to said position opposite said light emitting means, so that said detecting device detects the amount of ink remaining in each of said reservoir means; and means for controlling recording of image signals by said recording means.

9. An image forming apparatus according to claim 8, wherein said,means for inputting recording signals is a keyboard.

10. A recording apparatus for recording by use of recording means which records on a recording medium while correlatively shifting with respect to the recording medium, said apparatus comprising:

an ink amount detecting device for detecting an amount of ink in an ink reservoir means for storing said ink, said reservoir means correlatively shifting along a path with respect to the recording medium together with said recording means, said detecting device comprising:

a transparent member provided in a wall of said ink reservoir means, a single light emitting means for emitting light, said light emitting means being provided in a given position which is fixed relative to and along the path of said ink reservoir means, in order to emit light onto said transparent member when said transparent member arrives at a position opposite said light emitting means, a single light receiving means for receiving the light which is emitted from said light emitting means and which is totally reflected at least once on an inner surface of said transparent member in the ink reservoir means, wherein said transparent member includes a first stepping plane provided on a first portion of said transparent member whereon light emitted from said light emitting means is incident, said first stepping plane being orthogonal to an axis of incident said light, and a second stepping plane provided on a second portion of said transparent member wherefrom said light exits said transparent member toward said light receiving means, said second stepping plane being orthogonal to an axis of exiting said light, and the light emitted from said light emitting means to said transparent member reaches said light receiving means when totally reflected at least once on the inner surface of said ink reservoir means when said reservoir means is not in contact with the ink at a point where the light is incident on said inner surface, and is transmitted without any total reflection through the inner surface of said ink reservoir means when said reservoir means is in contact with the ink at said point, and detecting means for detecting if said light receiving means has received the light when said ink reservoir means arrives at said given position;

a carriage on which said recording means and said ink reservoir means are mounted;

scan means for scanning said carriage relative to the recording medium; and control means for controlling said scan means to scan said carriage so as to sequentially move the transparent member of each of said reservoir means to said position opposite said light emitting means, so that said detecting device detects the amount of ink remaining in each of said reservoir means.

11. A method for detecting an amount of ink in each of a plurality of ink reservoir means for storing inks, said reservoir means correlatively shifting along a path with respect to a recording medium together with a plurality of recording means for recording on the recording medium, said recording means corresponding a plurality of different colors of said inks, said method comprising the steps of:

providing a carriage on which said recording means and said ink reservoir means are mounted;

scanning said carriage relative to the recording medium;

providing a transparent member in a wall of each of said ink reservoir means;

emitting light from a single given position which is fixed relative to and along the path of said ink reservoir means onto said transparent member when said transparent member arrives at a position opposite said given position;

controlling said scanning to sequentially move the transparent member of each of said ink reservoir means to said position opposite said given position;

detecting for each said ink reservoir means if any said light has been totally reflected at least once in an inner surface of said transparent member in each said ink reservoir means when said plural ink reservoir means arrive at said position opposite said given position by detecting that the light emitted onto said transparent member is totally reflected at least once on the inner surface of said ink reservoir means which is not in contact with said ink at a point where the light is incident on said inner surface, and which is transmitted without any total reflection through the inner surface of said ink reservoir means which is in contact with said ink at said point;

causing the light emitted in said emitting step to enter said transparent member of each of said ink reservoir means; and detecting an amount of ink in each of said ink reservoir means in accordance with light received by light receiving means for detecting light emitted in said emitting step.

12. A method for detecting an amount of ink in an ink reservoir means for storing said ink, said reservoir means correlatively shifting along a path with respect to a recording medium together with a recording means for recording on the recording medium, said method comprising the steps of:

provoking a carriage on which said recording means and said ink reservoir means are mounted;

scanning said carriage relative to the recording medium;

providing in a wall of said ink reservoir means a transparent member having a first stepping plane in a first portion where the light is incident on said transparent member, said first stepping plane being orthogonal to an axis of incident said light, and a second stepping plane in a second portion where the light exits from said transparent member, said second stepping plane being orthogonal to an axis of exiting said light;

emitting light from a single given position which is fixed relative to and along a path of said ink reservoir means onto said transparent member when said transparent member arrives at a position opposite said given position;

controlling said scanning to sequentially move the transparent member of each of said ink reservoir means to said position opposite said given position;

detecting if any said light has been totally reflected at least once in an inner surface of said transparent member in each said ink reservoir means when said ink reservoir means arrives at said position opposite said given position by detecting that the light emitted onto said transparent member is totally reflected at least once on the inner surface of said ink reservoir means which is not in contact with said ink at a point where the light is incident on said inner surface, and which is transmitted without any total reflection through the inner surface of said ink reservoir means which is in contact with said ink at said point;

causing the light emitted in said emitting step to enter said transparent member of each of said ink reservoir means; and detecting an amount of ink in each of said ink reservoir means in accordance with light received by light receiving means for detecting light emitted in said emitting step.

13. A recording apparatus having a plurality of recording means each having a discharge port for discharging ink, scanning means for scanning said plurality of recording means in a predetermined main scan direction with respect to a recording medium, and a plurality of ink reservoir means for storing ink, said ink reservoir means correlatively scanning together with said recording means, said apparatus comprising:

ink detecting means provided along a path in which said plurality of ink reservoir means are scanned and being capable of detecting an ink remaining in each of said plurality of ink reservoir means; and detection control means for causing said scanning means to move said plurality of ink reservoir means in succession to a detection position by said ink detecting means so as to detect in succession the ink remaining in each of said plurality of ink reservoir means.

14. A recording apparatus according to claim 13, further comprising carriage means for mounting said plurality of recording means and said plurality of ink reservoir means, wherein said carriage means is scanned by said scanning means with respect to the recording medium.

15. A recording apparatus according to claim 13, wherein each of said plurality of ink reservoir means includes at least one transparent wall, and wherein said ink detecting means optically detects whether the ink remaining is less than a predetermined amount through said transparent wall.

16. A recording apparatus according to claim 13, wherein said recording means includes a thermal energy transducer and discharges ink by applying thermal energy to ink.

17. A recording apparatus according to claim 16, wherein said recording means causes a change of state of the ink in response to the thermal energy which is applied by said thermal energy transducer so as to discharge the ink from the discharge port in accordance with the change of state.

18. An ink detecting method for detecting ink remaining in ink reservoir means in a recording apparatus, the apparatus having a plurality of recording means each having a discharge port for discharging ink, scanning means for scanning the plurality of recording means in a predetermined main scan direction with respect to a recording medium, and a plurality of the ink reservoir means for storing ink, the ink reservoir means correlatively scanning together with the recording means, said method comprising:

providing ink detecting means along a path in which the plurality of ink reservoir means are scanned and being capable of detecting an ink remaining in each of the plurality of ink reservoir means;

moving, by using the scanning means, the plurality of ink reservoir means in succession to a detection position by the ink detecting means; and detecting, by using the ink detecting means, in succession the ink remaining in each of the plurality of ink reservoir means.

19. A method according to claim 18, wherein the recording means includes a thermal energy transducer and discharges ink by applying thermal energy to ink.

20. A method according to claim 19, wherein the recording means causes a change of state of ink in response to the thermal energy which is applied by the thermal energy transducer so as to discharge the ink from the discharge port in accordance with the change of state.

* * * * *

UNITED STATES PATENT AND TRADEMARK OFFICE
CERTIFICATE OF CORRECTION

PATENT NO.    : 6,012,795
DATED         : January 11, 2000
INVENTOR(S)   : Atsushi Saito, et al.

It is certified that error appears in the above-identified patent and that said Letters Patent is hereby corrected as shown below:

Column 1,
Line 19, delete the second occurrence of "liquid".

Column 3,
Line 66, change "with in)," to -- with air), --.

Column 6,
Line 42, change "include" to -- includes --.

Column 7,
Line 34, change "assemble;" to -- assembly; --.

Column 10,
Line 12, change "what" to -- What --.

Column 13,
Line 67, change "incident said" to -- said incident --.

Column 14,
Line 5, change "exiting said" to -- said exiting --; and
Line 34, change "corresponding" to -- corresponding to --.

Column 15,
Line 15, change "incident said" to -- said incident --; and
Line 19, change "exiting said" to -- said exiting --.

Signed and Sealed this

Ninth Day of October, 2001

*Attest:*

*Attesting Officer*

NICHOLAS P. GODICI
*Acting Director of the United States Patent and Trademark Office*